(No Model.)   N. R. H. BURNET.   2 Sheets—Sheet 2.
COTTON CULTIVATOR.

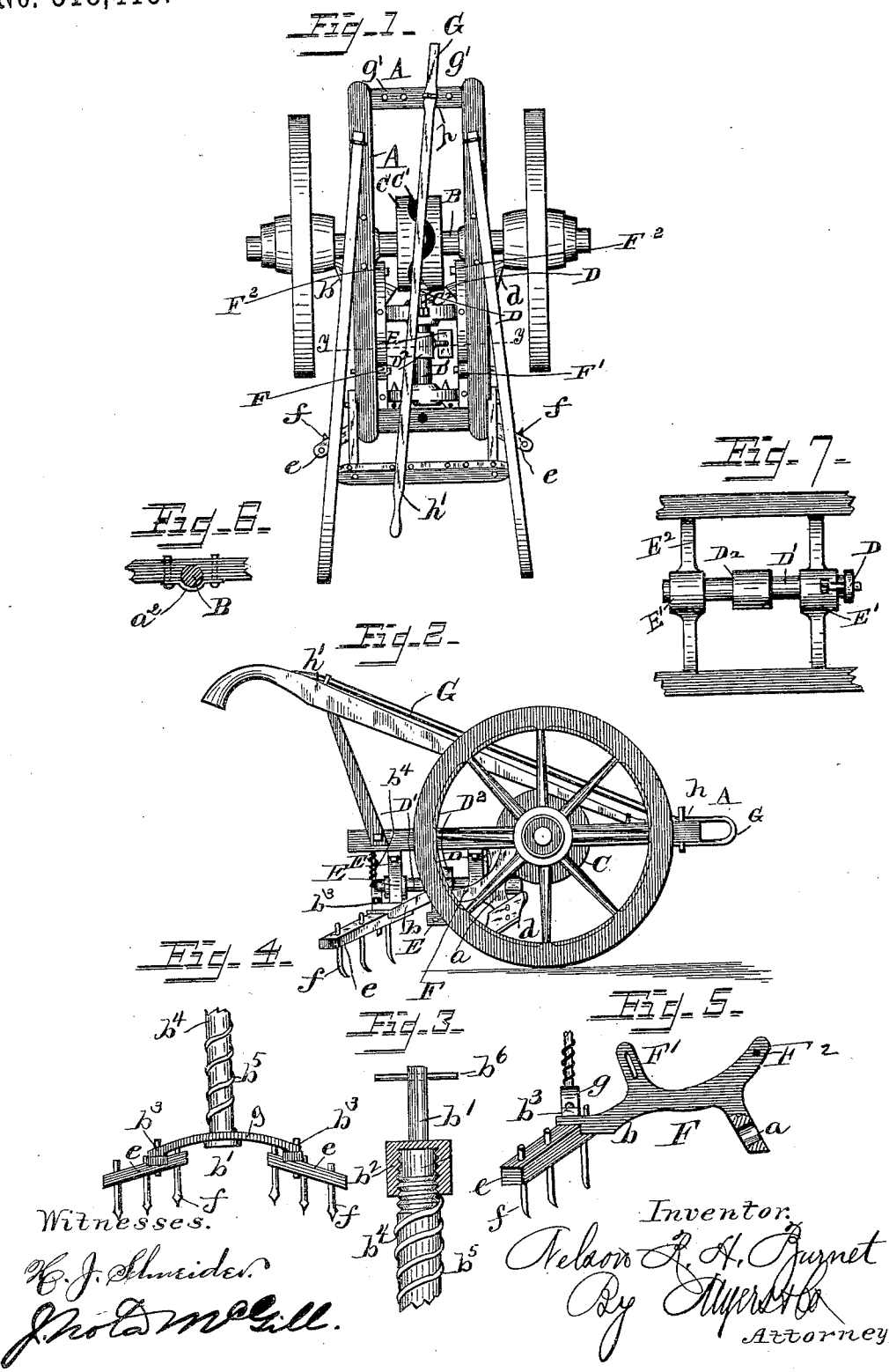

No. 318,415.   Patented May 19, 1885.

WITNESSES.   INVENTOR.

UNITED STATES PATENT OFFICE.

NELSON R. H. BURNET, OF MATTHEWS, NORTH CAROLINA.

COTTON-CULTIVATOR.

SPECIFICATION forming part of Letters Patent No. 318,415, dated May 19, 1885.

Application filed October 28, 1884. (No model.)

*To all whom it may concern:*

Be it known that I, N. R. H. BURNET, a citizen of the United States of America, residing at Matthews, in the county of Mecklenburg and State of North Carolina, have invented certain new and useful Improvements in Cotton-Cultivators, of which the following is a specification, reference being had therein to the accompanying drawings.

My invention pertains to an improvement in cotton-cultivators; and it consists in the peculiar construction, combination, and arrangement of the parts, substantially as hereinafter more fully shown and described.

Figure 8:
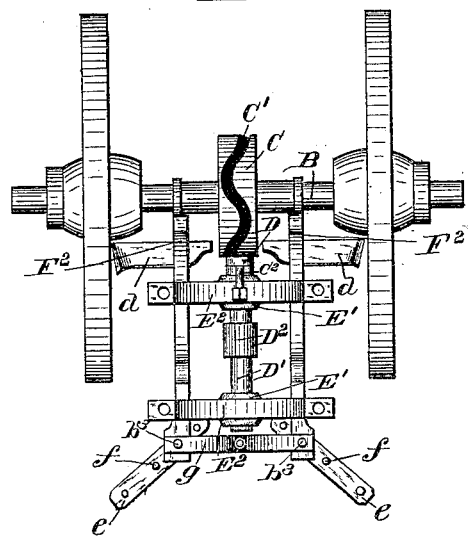
Figure 9:
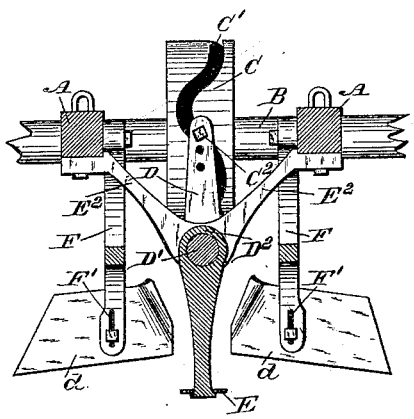

In the accompanying drawings, Figure 1 is a plan view of my invention. Fig. 2 is a side elevation. Figs. 3, 4, 5, 6, and 7 are detail views of my invention. Fig. 8 is a plan view of my invention with the frame removed, and Fig. 9 is an enlarged sectional view on the line $y$ $y$, Fig. 1.

The object of my invention is to combine in one and the same cultivator the several cultivating implements requisite to completely cultivate cotton, the implements being actuated by the movement of the plow in its progress over the soil, to provide such an adjustable clevis as admits adjustment of the direction of the cultivator before and to a limited extent during the progress of the cultivating operation, and also means whereby the cultivator-shovels may be adjusted vertically, provided with suitable bearing elasticity upon the soil, and aligned with the other cultivating hoes and scrapers, in order to produce a cotton-cultivator complete in all essential particulars for its intended purpose.

In the construction of my cultivator I project through metallic strap-supports $a^2$, (see Fig. 6,) secured to the under side of the rectangular frame A, the axle B, and thus support frame A, pivoted thereon; and upon axle B, I rigidly secure the wheel C, which is rotated by the motion of the vehicle-wheels of the cultivator, the cultivator-wheels being rigidly secured to their axle.

The wheel C, having formed on its periphery the zigzag slot C', wherein projects the bolt $C^2$, carried by the crank D, is designed by rotation thereof to oscillate the round longitudinal shaft D', which projects through and is rigidly secured in an eye or orifice, $D^2$, of the automatic hoe E, two or more of which may be employed. The shaft D', having integral therewith the crank D, has its bearings in orifices E', formed in the lower portion of the V-shaped brackets $E^2$, which are suitably disposed near each end of the shaft D', and rigidly secured to the under side of frame A.

The longitudinal sliding brackets F are pivotally connected to the frame A by the arms F' $F^2$. The arms F' of the brackets F are provided with vertical slots for reception of a bolt or pin secured to the longitudinal bars of frame A, to permit of the elevation or lowering of a frame, $e$, presently described. These brackets have standards $a$ and $b$, the former having secured thereto the scrapers $d$, and the latter the frame $e$, carrying the cultivator-teeth $f$, which frames are disposed in such manner as to flare obliquely outward. The frames $e$, in which are fastened the cultivator-teeth $f$, are each secured to the standards $b$, near their inner ends, by means of a nutted bolt, $b^3$, projected vertically through the cultivator-frame $e$, and also through bolt-orifices provided in the bridge $g$. (See Fig. 4.) This bridge $g$ is designed, in connection with the threaded spring-bar $b^4$, which is encircled by the spring $b^5$, as a means of adjusting the extent or force of pressure of the cultivator-teeth upon the soil. The bridge $g$ is held upon the spring-bar $b^4$ by means of its enlarged head $b'$, which cannot pass through the central orifice provided in the bridge; or it may be secured by a pin projected transversely through the lower end of the spring-bar. The spring-bar $b^4$ is threaded at and near the upper part thereof for reception of the coincident pressure-nut $b^2$, which is cast integral with the vertical rod $b'$, having the handle $b^6$ projected through a transverse orifice therein. The pressure-nut $b^2$ abuts against the under side of frame A, and this arrangement and construction of parts enables the pressure of the cultivator-teeth on the soil to be regulated—increased or diminished—as may be required in practice.

The rectangular frame A has formed therein the vertical orifices $g'$, for reception of the nutted bolt $h$, having a wrench-head, as usual, which bolt is designed, in connection with said orifices, for securing the lever-clevis G to frame A and adjusting the clevis to the right or left, to adapt the draft to the plane or inclination of the surface-soil. The clevis is provided with the arm $h'$, extending back to the handles of the cultivator, to enable the operator to alter or adjust to a limited extent the direction of the draft to suit the topographical contour of the ground, which is done by projecting the clevis-lever to the right or left.

Having thus fully described my invention, what I claim, and desire to secure by Letters Patent, is—

1. The combination of the brackets F, having arms $F'$ and $F^2$, and standards $a$ and $b$, scrapers $d$, cultivator-teeth $f$, and frame A, substantially as shown, and for the purpose described.

2. The combination of frame A, pressure-nut $b^2$, having rod $b'$ and handle $b^6$, spring-bar $b^4$, having spring $b^5$, bridge $g$, secured to brackets F, carrying cultivator-teeth $f$, and scrapers $d$, substantially as shown, and for the purpose described.

3. The combination of the frame A, pressure-nut $b^2$, spring-rod $b^4$, bridge $g$, cultivator-frames $e$, brackets F, and the V-shaped brackets $E^2$, supporting shaft $D'$, substantially as shown and described.

In testimony whereof I affix my signature in presence of two witnesses.

NELSON R. H. BURNET.

Witnesses:
  J. R. HOLLAND,
  E. A. McLEOD.